US012073188B1

(12) United States Patent
Gao et al.

(10) Patent No.: US 12,073,188 B1
(45) Date of Patent: Aug. 27, 2024

(54) MULTILINGUAL KEYWORD GENERATION

(71) Applicant: Amazon Technologies, Inc., Seattle, WA (US)

(72) Inventors: Yifan Gao, Hong Kong (HK); Qingyu Yin, Fushun (CN); Zheng Li, Sunnyvale, CA (US); Yiwei Song, San Mateo, CA (US); Bing Yin, Palo Alto, CA (US)

(73) Assignee: Amazon Technologies, Inc., Seattle, WA (US)

( * ) Notice: Subject to any disclaimer, the term of this patent is extended or adjusted under 35 U.S.C. 154(b) by 360 days.

(21) Appl. No.: 17/499,732

(22) Filed: Oct. 12, 2021

(51) Int. Cl.
*G06F 40/58* (2020.01)
*G06F 16/33* (2019.01)
*G06F 40/284* (2020.01)

(52) U.S. Cl.
CPC .......... *G06F 40/58* (2020.01); *G06F 16/3337* (2019.01); *G06F 40/284* (2020.01)

(58) Field of Classification Search
CPC .......... G06F 40/30; G06F 40/35; G06F 40/58; G06F 40/284; G06F 40/289; G06F 16/3337; G06F 16/951; G06F 16/3329; G06F 16/9537; G06F 16/9535; G06F 16/3344; G06F 16/24522; G06F 16/958; G06F 16/00; G06F 16/334; G06F 16/332; G06F 16/338; G06F 16/36; G06F 16/243; G06F 16/957; G06Q 30/02; G06Q 20/384; G09B 5/04

USPC ......................................................... 704/1–9
See application file for complete search history.

(56) References Cited

U.S. PATENT DOCUMENTS

| | | | |
|---|---|---|---|
| 6,901,403 B1* | 5/2005 | Bata ........................ | G06F 16/26 |
| 2004/0064305 A1* | 4/2004 | Sakai ...................... | G06F 40/55 |
| | | | 704/9 |
| 2004/0186743 A1* | 9/2004 | Cordero, Jr. ....... | G06Q 10/1053 |
| | | | 705/321 |
| 2022/0164538 A1* | 5/2022 | Bornea ................... | G06F 40/30 |
| 2022/0197905 A1* | 6/2022 | Liu ..................... | G06F 16/2452 |

* cited by examiner

*Primary Examiner* — Leshui Zhang
(74) *Attorney, Agent, or Firm* — Lee & Hayes, P.C.

(57) ABSTRACT

Systems and methods for multilingual keyword generation for low-resource language passages are disclosed. For example, high-resource language passages describing items in a catalog or other such passages may include numerous keywords for classifying and searching for the item while a low-resource language description of the item may not include the same rich keyword environment due to lower usage and traffic in the low-resource language. The systems and methods herein provide for leveraging the high-resource language through a multilingual natural language processing algorithm to identify similar passages across language barriers and identify keywords in the high-resource language for input into a decoder to generate keywords in the low-resource language.

20 Claims, 5 Drawing Sheets

Soft Cuddly Teddy Bär

€20.00
38 cm
Grau

Bereits der Name des Soft Cuddly Teddybär sagt es schon aus: der 38 cm gosße freund mit seinem honigsüßen lächeln begeistert alle Kinderherzen. Die eingaearbeiteten Granulatsäckchen im Gesäß, den Pfoten und sohlen sorgen für ein sicheres Sitzen. Aber auch zum Greifen lernen sind sie optimal geeignet.

Keywords: [brand] kuscheltier; teddy bär; baer; grau; honey; soft cuddly friend

404

Soft Cuddly Teddy Bear

$25.00
38 cm
Gray

The name of the Soft Cuddly Teddy Bear already says it all: the 38 cm tall friend with his honey-sweet smile delights all children's hearts. Granulate bags in the buttocks, paws, and soles ensure safe sitting. But they are also ideal for learning to grip Keywords: teddy bear; grey; honey; vintage; soft; [brand] stuffed animal; honey, [brand] teddy bear

MULTILINGUAL KEYWORD GENERATION

BACKGROUND

Keywords are single or multi-word lexical units that summarize or represent a piece of text. As such, they are of great importance for indexing, categorizing, classification and browsing in many information retrieval tasks. Keywords are often expert or manufacturer defined for products and can include words or phrases that may be present (substrings of) or absent in the source text. The keywords may then be used to classify, search, categorize, and relate different items in an online catalog or other collection of items together.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

DETAILED DESCRIPTION

In electronic marketplaces or electronic catalogs, especially those hosted over the internet, a variety of languages may be required to serve users in different regions and who speak different regions. Typically, keywords are used to identify items and used to classify, categorize, filter, search, and otherwise identify items sought by users within the electronic marketplace. In many instances, electronic marketplaces using English language descriptions for items and English language keywords have abundant user queries, click-through data, and refinement of keywords for use in the marketplace. In such cases, generating keywords for similar items, or items of a similar type from different providers (e.g., manufacturers or re-sellers) can leverage the abundantly available data to identify and determine a set of keywords to associate with the item for ease of addition into the marketplace. In many instances, other languages, especially languages with less abundant data, are limited to a particular user population which leads to a limited data set and deficiencies in keyword prediction, generation, refinement, and assignment to items. The decreased keyword usage results in inferior search performance for the online marketplace that may be improved by leveraging the abundant data from other language sets of the marketplace.

An additional difficulty in identifying keywords for low-resource languages in the online marketplace is the failure of direct translation of terms to adequately capture the context of the item and the associated keywords. For instance, a direct translation of a term may not yield a keyword in a second language that a native speaker of the second language is likely to associate with the item. As such, a system and technique for generating keywords to improve search results and products is needed. The systems and techniques herein are capable of identifying similar passages from item descriptions in high-resource language sets and leveraging those passages to generate keywords in the low-resource language.

The description herein provides for generating keywords for these low-resource languages by leveraging knowledge in the high-resource language (aka English). Specifically, the systems and methods herein provide a retrieval-augmented approach for multilingual keyword generation. Given an item description in a low-resource language X, the cross-lingual retrieval system described herein finds similar item descriptions in English (e.g., item descriptions for items that are similar). Intuitively, the associated English keywords of these retrieved item descriptions are semantically related to the current item description in language X. Next, a generation module receives these associated English keywords as external knowledge and generates the keywords in language X accordingly.

The systems and methods herein additionally provide for sufficient supervision to train the machine learning algorithm through an iterative self-training system. This may be needed because the parallel passage pairs between English (or other high-resource languages) and other low-resource languages are limited because not every product in the English marketplace will be sold in other non-English marketplaces. Therefore, in order to generate enough supervision to train the algorithm, an iterative self-training scheme is described herein to provide sufficient training data with labels to train the algorithm.

In an example, the systems and method herein provide for generation of keywords in low-resource languages by leveraging high-resource item descriptions and keywords through the use of a multilingual encoder-based algorithm. The techniques described herein provide for a sequence-to-sequence learning approach to keyword generation. The techniques described herein identify a sequence of keywords in the low-resource language. The sequence-to-sequence approach provides an improvement over mere translation of keywords from a high-resource language because the sequence-to-sequence based approaches are able to predict keywords for the low-resource language based on present and absent keywords.

Initially, a source of text, the query description that describes the item in the low-resource language, is provided to the system. The query description is provided to a retriever module, the retriever module may, in some examples, include a multilingual bidirectional encoder from transformer ("mBERT"). The mBERT is a multilingual network-based technique for natural language processing pre-training. The technique applies bidirectional training of a transformer for language modelling. The mBERT algorithm includes an encoder that receives an input as a sequence of tokens that are converted into vectors and processed in a neural network. The mBERT maps sequences of inputs to sequences of outputs. The retriever processes the query description through the mBERT and accesses an external knowledge database to identify similar item descriptions from a high-resource language. The similar descriptions are identified by processing each of the high-resource item descriptions through the mBERT retriever and subsequently determining a similarity score for the item descriptions in the high-resource language, the similarity score related to the similarity to the query description. In some examples, the similarity score may be determined by processing the output of the mBERT as a dot product of the vectors for the query description (vector output of the mBERT) and the vectors for the high-resource language descriptions (vector outputs). One or more high-resource language passages may be selected based on the dot product producing a score exceeding a predetermined threshold.

After determining the set of high-resource language descriptions, the keywords associated with each of the high-resource language descriptions may be accessed from the database. The accessed keywords and the query description are then provided as inputs into a generator. The generator concatenates the keywords and the query description into a sequence and uses a multilingual bidirectional and auto-regressive transformer to generate keywords in the low-resource language based on the inputs to the generator.

The machine learning models described herein may be iteratively self-trained, which may be important due to the importance of parallel descriptions in both languages while training, though not every item will be available in marketplaces geared towards each of the languages in use. Additionally, to further expand the scope of use, for example to classify of scientific papers, academic papers, news articles, and the like, an iterative self-training process provides for effective training of the retriever without the need for a large parallel labeled dataset for training. In the iterative self-training process, passages retrieved by the retriever are labelled as positive instances of the query description if and only if the keywords associated with the retrieved passages are used in the generation of the low-resource language keywords by the generator. This is determined through a comparison of the keywords generated using a baseline model without the particular retrieved passage against the keywords generated using the model having the input of the retrieved passage. In this manner, passages may be labelled as positive retrievals when they positively impact the keyword generation, thereby self-training the algorithm through iterations.

The systems and techniques described herein provide several benefits over typical keyword generating systems and techniques. In typical systems, generating the keywords may be a resource intensive operation that may underperform in generating keywords or may resort to simple translation. In contrast, the systems and techniques described herein provide for generation of keywords in a resource efficient manner that reduces processor cycles by leveraging the neural network and multilingual transcoders described herein. In addition to the technological advantage of producing keywords in a resource-efficient manner, the keywords generated will produce additional keywords that may be overlooked or ignored through other methods, such as in simple extraction of keywords from passages that fail to generate keywords not present in the passage. In particular, the techniques described herein enable keyword prediction for low-resource languages capable of predicting keywords based on present and absent keywords through the machine learning model. In other words, the system described herein provides for keyword generation and not simply keyword extraction from a passage. Keywords generated by the techniques herein may not be included in the passage themselves, providing further context and data useful for classifying and searching the online marketplace. Additionally, the system is capable of iteratively self-training on data with limited parallel (descriptions and keywords existing in both high- and low-resource language sets).

The present description provides an overall understanding of the principles of the structure, function, manufacture, and use of the systems and methods disclosed herein. One or more examples are illustrated in the accompanying drawings. Those of ordinary skill in the art will understand that the systems and methods specifically described herein and illustrated in the accompanying drawings are non-limiting embodiments. The features illustrated or described in connection with one embodiment may be combined with the features of other embodiments, including as between systems and methods. Such modifications and variations are intended to be included within the scope of the appended claims.

Additional details are described below with reference to several example embodiments.

Figure 1:
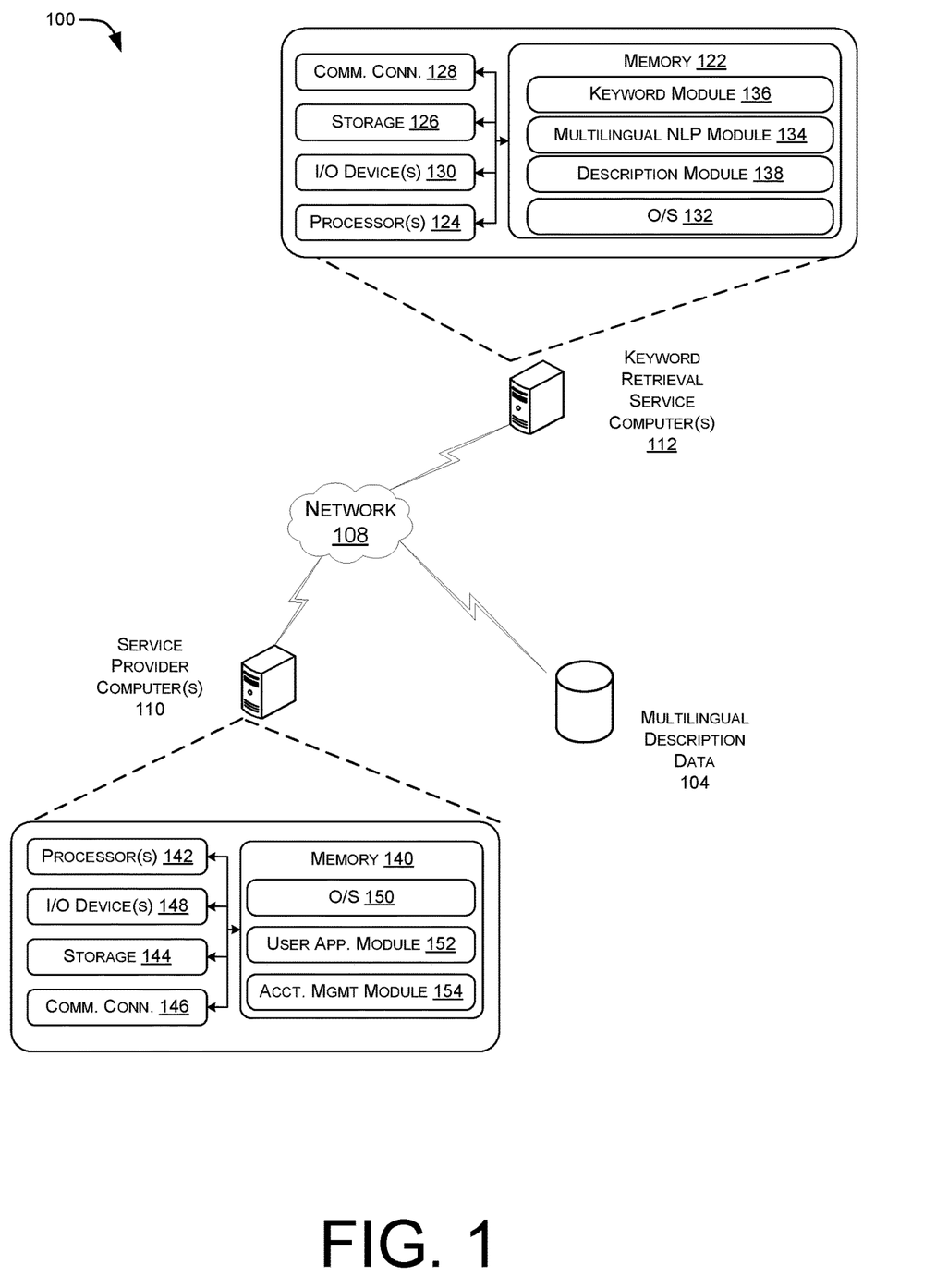
FIG. 1 illustrates a schematic diagram of an example environment and system architecture for multilingual keyword generation, according to at least some examples.

FIG. 1 illustrates a schematic diagram of an example environment and architecture 100 for multilingual keyword generation, according to at least some examples. In architecture 100, one or more computers 110 and 112 and database 104 may communicate over a network 108 to accomplish the techniques described herein. In some examples, the techniques described herein may be carried out on a distributed system (as shown) while in some examples the techniques may be carried out on a single computing system. In some examples, service provider computer(s) 110 may provide access to an online marketplace, such as for e-commerce purchases and browsing of electronic item catalogs. Keyword retrieval service computer(s) 112 may provide keyword generation services to provide keywords to the service provider computer(s) 110 to aid in navigation, classification, and use of the online marketplace. It should be understood that any functionality described herein may be provided by any of these devices and/or computers, especially by way of the service provider computer(s) 110 and/or the keyword retrieval service computer(s) 112, additionally, as desired, the service provider computer(s) 110 and keyword retrieval service computer(s) 112 may be the same computers.

In some examples, the network 108 may include any one or a combination of multiple different types of networks, such as cable networks, the Internet, wireless networks, cellular networks, and other private and/or public networks.

As described briefly above, the service provider computer(s) 110 may host an online marketplace where users interact to purchase goods and/or services, and/or to access various user accounts hosted by or provided by the service provider computer(s) 110 and associated with the users. The service provider computer(s) 110, perhaps arranged in a cluster of servers or as a server farm, may host a website, a desktop application, a mobile application, etc. to provide the online marketplace functionality. Other server architectures may also be used to host the website, desktop application, and/or mobile application.

As noted above, the architecture 100 may include one or more keyword retrieval service computer(s) 112. The keyword retrieval service computer(s) 112 may include any type of computing devices such as, but not limited to, mobile, desktop, thin-client, server, and/or cloud computing devices. In operation, the keyword retrieval service compute(s) 112 may be configured to execute computer-executable instructions in order to form a special-purpose computer or particular machine that facilitates natural language processing, keyword generation, and other such service. In some examples, the keyword retrieval service computer(s) 112 may be in communication with the service provider computer(s) 110 via the network 108, or via other network connections. In certain embodiments, the keyword retrieval service computer(s) 112 may include one or more servers, perhaps arranged in a cluster, as a server farm, or as individual servers not associated with one another. These servers may be configured to carry out the techniques described herein. In some examples, the keyword retrieval service may be performed for, or at the request of, the service provider computer(s) 110. Additionally, in some aspects, various services may be separate and distinct from one another (and/or implemented on different machines by different providers), while in other aspects, the various services may be provided by a single keyword retrieval service computer 112 and/or may be integral to the service provider computer(s) 110.

The keyword retrieval service computer(s) is configured to receive a query description that describes an item in the low-resource language from the multilingual description data 104. The query description is provided to a multilingual NLP module 134, which may be referred to herein as a retriever module and may, in some examples, include a multilingual bidirectional encoder from transformer ("mBERT"). The mBERT is a multilingual network-based technique for natural language processing pre-training. The technique applies bidirectional training of a transformer for language modelling. The mBERT algorithm includes an encoder that receives an input as a sequence of tokens that are converted into vectors and processed in a neural network. The mBERT maps sequences of inputs to sequences of outputs. The retriever processes the query description through the mBERT and accesses the multilingual description data 104 to identify similar item descriptions from a high-resource language, or any other language. The similar descriptions are identified by processing each of the passages from the multilingual description data 104 through the mBERT retriever. In some examples, only a subset of the descriptions from the multilingual description data 104 is processed through the mBERT, for example, by processing only within a category or sub-category of a catalog to identify similar description data. After initial processing, the mBERT is used to determine a similarity score for the item descriptions in the high-resource language (English), the similarity score related to the similarity to the query description (low-resource language). In some examples, the similarity score may be determined by processing the output of the mBERT as a dot product of the vectors for the query description (vector output of the mBERT) and the vectors for the high-resource language descriptions (vector outputs). One or more high-resource language passages may be selected from the multilingual description data 104 based on the dot product producing a score exceeding a predetermined threshold.

After determining the set of high-resource language descriptions, the keywords associated with each of the high-resource language descriptions may be accessed from the multilingual description database 104. The accessed keywords and the query description are then provided as inputs into the keyword module 136. The keyword module concatenates the keywords and the query description into a sequence and uses a multilingual bidirectional and autoregressive transformer ("mBART") to generate keywords in the low-resource language based on the inputs to the keyword module. By leveraging the mBERT in the multilingual NLP module 134 as well as the mBART in the keyword module 136, the architecture 100 is able to produce keywords in the low-resource language in an efficient manner and without relying on translation and extraction of text from the passage.

In one illustrative configuration, the keyword retrieval service computer(s) 112 may include at least one memory 122 and one or more processing units (or processor(s) 124). In some examples, the processor(s) 124 of the keyword retrieval service computer(s) 112 may be implemented as appropriate in hardware, software, firmware, or combinations thereof. Various implementations of the processor(s) 124 may include computer-executable or machine-executable instructions written in any suitable programming language to perform the various functions described.

The memory 122 may store program instructions that are loadable and executable on the processor(s) 124, as well as data generated during the execution of these programs. Depending on the configuration and type of keyword retrieval service computer(s) 112, the memory 122 may be volatile (such as random access memory ("RAM")) and/or non-volatile (such as read-only memory ("ROM"), flash memory, etc.). The keyword retrieval service computer(s) 112 or servers may also include additional storage 126, which may include removable storage and/or non-removable storage. The additional storage 126 may include, but is not limited to, magnetic storage, optical disks, and/or tape storage. The disk drives and their associated computer-readable media may provide non-volatile storage of computer-readable instructions, data structures, program modules, and other data for the computing devices. In some implementations, the memory 122 may include multiple different types of memory, such as static random access memory ("SRAM"), dynamic random access memory ("DRAM"), or ROM.

The memory 122 and the additional storage 126, both removable and non-removable, are all examples of computer-readable storage media. For example, computer-readable storage media may include volatile and non-volatile, removable and non-removable media implemented in any method or technology for storage of information such as computer-readable instructions, data structures, program modules, or other data. The memory 122 and the additional storage 126 are all examples of computer storage media.

The keyword retrieval service computer(s) 112 may also contain communications connection(s) 128 that allow the keyword retrieval service computer(s) 112 to communicate with stored databases, other computing devices or servers, user terminals, and/or other devices on the network 108. The keyword retrieval service computer(s) 112 may also include input/output ("I/O") device(s) 130, such as a keyboard, a mouse, a pen, a voice input device, a touch input device, a display, speakers, a printer, etc., that facilitate user interaction with the suggestion/recommendation service computers 112.

Turning to the contents of the memory 122 in more detail, the memory 122 may include a wide variety of description data and/or other stored data (e.g., data files, profile information, etc.), an operating system ("OS") 132, and one or more application programs or services for implementing the features disclosed herein, including a keyword module 136, a multilingual natural language processing ("NLP") module 134, and a description module 138. The description module 138 may include a wide variety of data associated with any number of items including, but not limited to, item description, item feature information, item detail information, item description information, item tag information, item review information, item rating information, etc. In certain embodiments, the description module 138 may include textual description data for any number of items. The description module 138 may be obtained from any number of suitable sources, such as item manufacturers, merchants, distributors, wholesalers, and/or the service provider computer(s) 110. In addition to storing the description module 138, in certain embodiments, historical information associated with events, actions, and/or other user interactions with various items may be stored. Indeed, a wide variety of information associated with items may be stored in the memory 122. The OS 132 may include one or more suitable applications and/or program modules that facilitate the general operation of the keyword retrieval service computer(s) 112, as well as the execution of one or more of the additional application programs.

In some aspects, the multilingual NLP module 134 may include any number of suitable applications and/or modules configured to inputs of item descriptions in multiple languages and identify item descriptions or text passages that share at least a threshold similarity with a reference passage. As described in further detail below, with respect to FIG. 2, the retriever 206 may identify a subset of passages from a larger collection of passages, such as a collection of item descriptions from an item catalog in a first language that correspond or share a threshold similarity with a query passage in a second language. The multilingual NLP module 134 may include multiple different modules or components, for example including a multilingual bidirectional encoder representations from transformers ("mBERT") in addition to other components or modules to perform a similarity comparison on the output of the mBERT, as described with respect to FIG. 3 below, to identify passages having at least a threshold similarity with the query passage across a language barrier. Once one or more passages are identified by the multilingual NLP module 134, the respective description data and keywords associated with the items described by the passages may be accessed from memory 122 or obtained from any number of data sources or other components of the architecture 100.

The memory 122 may also include a keyword module 136, which may include any number of suitable applications and/or modules configured to perform keyword analysis on various items and/or groups of items and to generate keywords based on the passages identified by the multilingual NLP module 134. In operation, the keyword module 136 may include a multilingual bidirectional and auto-regressive transformer that receives inputs of keywords associated with the passages identified by the multilingual NLP module 134 and the query passage and outputs a set of keywords for the query passage based on the inputs provided. The keywords, once identified by the keyword module 136, may be associated with the item in the online catalog such that the keywords may aid in categorizing, classifying, identifying, searching, and retrieving the item and the item description from the online catalog.

The keywords may be generated by using a multilingual denoising sequence to sequence language model. In some examples, a multilingual bidirectional and auto-regressing transformer ("mBART") is used as the sequence to sequence language model. The mBART illustrates performance gains in unsupervised neural network machine translation. The keyword generator receives code-mixed inputs as a concatenation of keywords in a high-resource language from the retrieved passages as well as the input of the query passage. The model is trained by optimizing the negative log likelihood loss of the model. The model outputs a string of keywords following an identifier of the query language (low-resource language).

As noted above, in some aspects, the architecture 100 may also include one or more service provider computer(s) 110. The service provider computer(s) 110 may include any types of computing devices such as, but not limited to, mobile, desktop, thin-client, server, and/or cloud computing devices. In some examples, the service provider computer(s) 110 may be in communication with the keyword retrieval service computer(s) 112 as well as one or more user devices (not shown) through which a user may interact with the service provider computer(s) 110 to access the services provided thereby. In certain embodiments, the service provider computer(s) 110 may include one or more servers, perhaps arranged in a cluster, as a server farm, or as individual servers not associated with one another. These servers may be configured to host a website (or combination of websites) viewable via the user device and/or any suitable user application (e.g., a Web browser, a dedicated application, etc.) accessible by any number of users. Additionally, in some aspects, the service provider computer(s) 110 may be configured to perform the actions of the multilingual NLP module 134, the keyword module 136, the description module 138, and any other actions of the keyword retrieval service computer(s) 112 as part of an integrated, distributed computing environment.

In one illustrative configuration, the service provider computer(s) 110 may include at least one memory 140 and one or more processing units (or processor(s) 142). The processor(s) 142 may be implemented as appropriate in hardware, software, firmware, or combinations thereof. Various implementations of the processor(s) 142 may include computer-executable or machine-executable instructions written in any suitable programming language to perform the various functions described. As a result of executing computer-executable instructions, the service provider computer(s) 110 may form special-purpose computers or particular machines configured to host and/or provide website and/or other network-based functionality to users. Additionally, the service provider computer(s) 110 may be configured to provide user information, user account information, user event data, item description data, and/or other data to the keyword retrieval service computer(s) 112 for evaluation.

The memory 140 may store program instructions that are loadable and executable on the processor(s) 142, as well as data generated during the execution of these programs. Depending on the configuration and type of service provider computer(s) 110, the memory 140 may be volatile (such as random access memory ("RAM")) and/or non-volatile (such as read-only memory ("ROM"), flash memory, etc.). The service provider computer(s) 110 or servers may also include additional storage 144, which may include removable storage and/or non-removable storage. The additional storage 144 may include, but is not limited to, magnetic storage, optical disks, and/or tape storage. The disk drives and their associated computer-readable media may provide non-volatile storage of computer-readable instructions, data structures, program modules, and other data for the computing devices. In some implementations, the memory 140 may include multiple different types of memory, such as static random access memory ("SRAM"), dynamic random access memory ("DRAM"), or ROM.

The memory 140 and/or the additional storage 144, both removable and non-removable, are all examples of computer-readable storage media. For example, computer-readable storage media may include volatile and non-volatile, removable and non-removable media implemented in any method or technology for storage of information such as computer-readable instructions, data structures, program modules, or other data. The memory 140 and the additional storage 144 are all examples of computer-readable storage media.

The service provider computer(s) 110 may also contain communications connection(s) 146 that allow the service provider computer(s) 110 to communicate with a stored database, another computing device or server, user terminals, and/or other devices on the networks 108. The service provider computer(s) 110 may also include input/output ("I/O") device(s) 148, such as a keyboard, a mouse, a pen, a voice input device, a touch input device, a display, speakers, a printer, etc., that facilitate user interaction with the service provider computer(s) 110.

Turning to the contents of the memory 140 in more detail, the memory 140 may include an operating system ("OS") 150 and one or more application programs or services for implementing the features disclosed herein including a user application module 152 and/or an account management module 154. The OS 150 may include one or more suitable applications and/or program modules that facilitate the general operation of the service provider computer(s) 110, as well as the execution of one or more of the additional application programs. The user application module 152 may include one or more suitable applications and/or modules configured to generate, host, or otherwise provide a website or other program for interaction by a user.

In some examples, the account management module 154 may be configured to maintain, or otherwise store, account information associated with one or more requested accounts. The account information may include account holder information, a user ID, a password, acceptable answers to challenge questions, etc. In this regard, users may be authenticated when accessing and/or utilizing the website.

Figure 2:
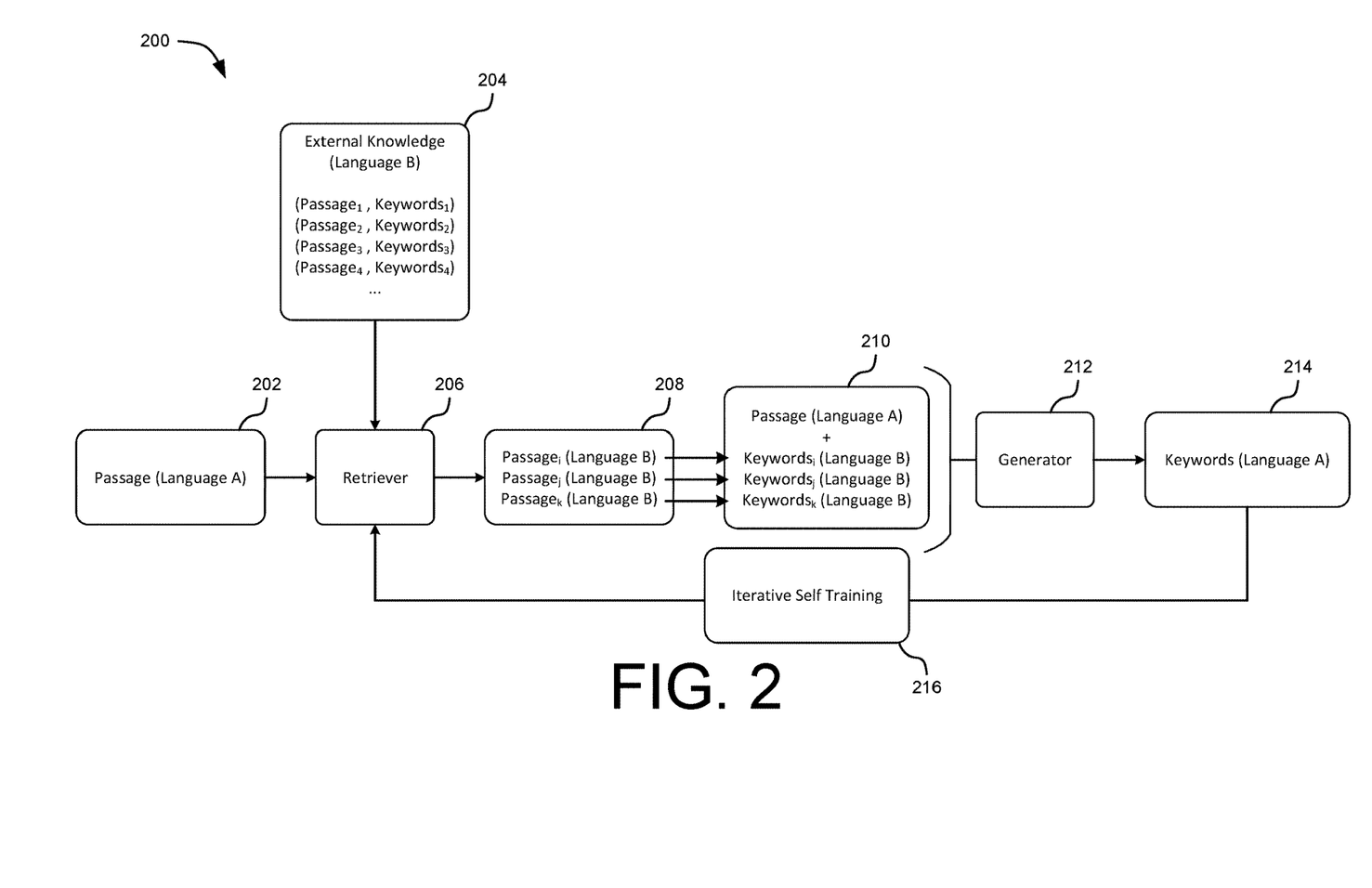
FIG. 2 illustrates a conceptual block diagram of a multilingual keyword generation framework, according to at least some examples.

FIG. 2 illustrates a conceptual block diagram of a framework 200 for multilingual keyword generation, according to at least some examples. The framework 200 includes a retriever 206 and a generator 212 that may be embodied in the multilingual NLP module 134 and the keyword module 136 of FIG. 1. The framework 200 may be carried out across multiple computing devices, such as the service provider computer(s) 110 and/or the keyword retrieval service computer(s) 112.

In an example processed through the framework 200, a passage in language A may be an item description for an item available in an electronic marketplace in a first location. The language A, in this example will be discussed with reference to a German language description for a teddy bear, as described with respect to FIG. 4 below. The teddy bear is available for sale through the online marketplace but is only associated with a limited number of keywords. The limited keywords may make it difficult to find the teddy bear when searching the marketplace. The framework 200 provides a system for generating the keywords in German for the item that may be used to search the electronic marketplace for the item. In this example, the external knowledge may include English language descriptions for items available from the item marketplace in English rather than German. In the framework 200, a passage 202 is provided in a first language (language A—German). The passage 202 is in a low-resource language and does not have any keywords, or may need additional keywords generated for use in classifying the item described in the passage 202. The passage 202 may include an item description, may be a short paragraph, a few lines, several pages, or longer. The passage 202 may include abstracts for scientific papers, scholarly articles, news articles, or other written text that may be searched for and therefore benefit from association with a string of keywords that aid users in finding the passage 202.

The framework 200 also includes external knowledge 204 that includes passages and keywords in one or more languages, including a high resource language (language B—English). Though described herein with reference to language B, the external knowledge 204 may include multiple languages that may be accessed and processed. The passages in English are in a high-resource language that is highly used and has frequent interaction and traffic in the online marketplace. Because of the high traffic and interaction, the passages in English have large sets of keywords that have been used, verified, and expanded through continued use and interaction with the online marketplace. Because of the heavy use and characterization in English, the keywords will be useful for generating the German keywords for the query passages. The passages may be similar to the passage 202, and may describe items in a catalog, include articles, papers, passages of text, and other such strings of text to be summarized by keywords. The keywords are associated with the passages and may be expert-defined, automatically generated (as described herein), extracted from the passages, or otherwise produced and associated with the passages in the external knowledge 204.

A retriever 206 serves to identify one or more passages from the external knowledge 204 that bear a similarity to the passage 202. The retriever 206 identifies similar passages by processing the German passage and the English passages through the mBERT to produce vector outputs. The vector outputs can then be compared, with the German passage compared against each of the English passages by performing a dot product of the vector output from processing the German passage against the output of each of the vector outputs from processing each of the English passages. The dot product of those vectors produces a similarity score of the vector outputs to the German passage that is useful for identifying and ranking each of the English passages with respect to the German passage as described below. An example of at least a portion of the retriever 206 is shown and described with respect to FIG. 3 below. The retriever 206 includes an mBERT module that processes the passage 202 as well as the passages from the external knowledge 204. Though described with respect to mBERT, any other machine learning model or algorithm capable of processing multilingual inputs and outputting vectors representative of the contents of the inputs separated by tokens and/or classifiers may be used. In some examples, other trained machine learning models may be implemented in the retriever 206 that are capable of identifying similar passages from multilingual inputs and generate a similarity score for a set of passages when compared against a query passage, such as passage 202. The retriever 206 may be trained by optimizing the negative log likelihood loss of the positive passage.

In one example, the retriever 206 receives the inputs of the passage 202 and the external knowledge 204 and passes the passages from each through the mBERT to produce a vector output for each passage. The vector output represents the passage and is the result of passing the passage through the mBERT algorithm. The vector output may have a number of entries all related to classifiers and representations of the text of the passage. The vector output of each may include a classifier, token and one or more vectors. The similarity score is produced by calculating a dot product or scalar product that takes two equal-length sequences, such as the vector outputs, and returns a single scalar. By calculating a dot product of the vector output of the mBERT from the input of the passage 202 with the vector output of the mBERT from the input of the passages from the external knowledge 204, a similarity score may be generated for the passages of the external knowledge. The similarity score may be a score between zero and one, or between negative one and one representative of the degree of similarity of the passages. A score approaching one is indicative of a high degree of similarity.

Based on the similarity scores for the passages of the external knowledge 204, the retriever 206 outputs the similar passages 208, or otherwise identifies the similar passages 208 from the external knowledge 204 that meet a similarity score criteria. In some examples, the retriever 206 may identify a similar passage 208 based on the similarity score being the highest of the similarity scores for each passage of the external knowledge 204. In some examples the retriever 206 may select or identify one or more similar passages 208 based on the similarity score exceeding a threshold score. In this example, the similar passages 208 may include any number of passages that meet the predetermined similarity criteria. In some examples, the retriever 206 may identify or select a predetermined number of similar passages 208, for example by selecting five similar passages having the highest similarity scores. Returning to the example, the retriever 206 outputs a list of one or more English passages that have the highest similarity scores with the German passage. In the example, the similar passages 208 are identified from the external knowledge 204 and are a subset of the English passages most similar to (e.g., describing an item or containing words) the German description.

The retriever 206, as described above, may include an mBERT algorithm or other machine learning model. One difficulty associated with training such machine learning models on the multilingual data required to process the passages is that parallel passage pairs between the high-resource language and the low-resource languages are limited because not every product in a marketplace in the English language will also be sold in other marketplaces that are in non-English languages. Therefore, in order to generate enough supervision to train the algorithm, an iterative self-training scheme is described herein to provide sufficient training data with labels to train the algorithm. In the iterative self-training process, passages retrieved by the retriever 206 are labelled as positive instances of the query description if and only if the keywords associated with the similar passages 208 passages are used in the generation of the low-resource language keywords by the generator 212. This is determined through a comparison of the keywords generated using a baseline model without the particular retrieved passage against the keywords generated using the model having the input of the retrieved passage. In this manner, passages may be labelled as positive retrievals when they positively impact the keyword generation, thereby self-training the algorithm through iterations.

After identifying the similar passages 208, the keywords previously identified with the similar passages 208, that are stored in the external knowledge 204, are identified and accessed from the database of English language passages and corresponding keywords. The previously identified keywords are in the high-resource language such that the keywords have been produced and verified through use in the online marketplace. In this way, the keywords may have been expert-defined or automatically produced in some manner but are verified and used in the online marketplace such that the keywords are verified before being used to identify the German language keywords. The keywords and the passage 202 are provided as inputs 210 to a generator 212 that generates one or more keywords 214 in the low-resource language (language A). The generator 212 includes an mBART algorithm, as described above and is capable of identifying keywords included in and absent from the passage 202. In this manner, the keywords 214 in the low-resource language become a valuable set of keywords for classifying the item and/or passage and providing accurate summarizing text that may be used to identify similar items and/or passages in the low-resource language or to categorize within a catalog of items available from an online marketplace.

In some examples, the keywords generated by the generator 212 may then be further refined by reducing or eliminating keywords. For example, in some cases the keywords may include numeric strings that are generated but do not serve as keywords useful for a user to search the catalog, accordingly such numeric strings may be eliminated as the inclusion of numeric strings may only confuse a classification based on the numeric string. Looking at the example in FIG. 4 again, for example, a keyword generated including the string "38" may have been produced based on the height of the teddy bear. However, such information may not be helpful as a keyword as it may relate to numerous other unrelated products also having a "38" dimension that are otherwise completely unrelated. In some examples, the keywords may further be analyzed for duplicate keywords, including duplicate keywords generated by the generator 212 as well as keywords produced by the generator 212 that match pre-existing keywords associated with the item.

In some examples, the retriever 206 may be iteratively self-trained based on the output of the keywords 214. The iterative self-training may be used to improve performance of the retriever 206. The iterative self-training may be based on an F-score, e.g., a measure of accuracy, of the retriever 206. Success of the retriever 206 may be evaluated based on the F-score. In the iterative self-training process, passages 208 retrieved by the retriever 206 are labelled as positive instances of the passage 202 if and only if the keywords 214 associated with the retrieved passages 208 are used in the generation (e.g., by the generator 212) of the low-resource language keywords. This is determined through a comparison of the keywords 214 generated using a baseline model without the particular retrieved passage, one of passages 208, against the keywords 214 generated using the model having the input of the retrieved passage 208. In this manner, each of the retrieved passages 208 may be labelled as positive retrievals when they positively impact the keyword generation, thereby self-training the algorithm through iterations.

Figure 3:
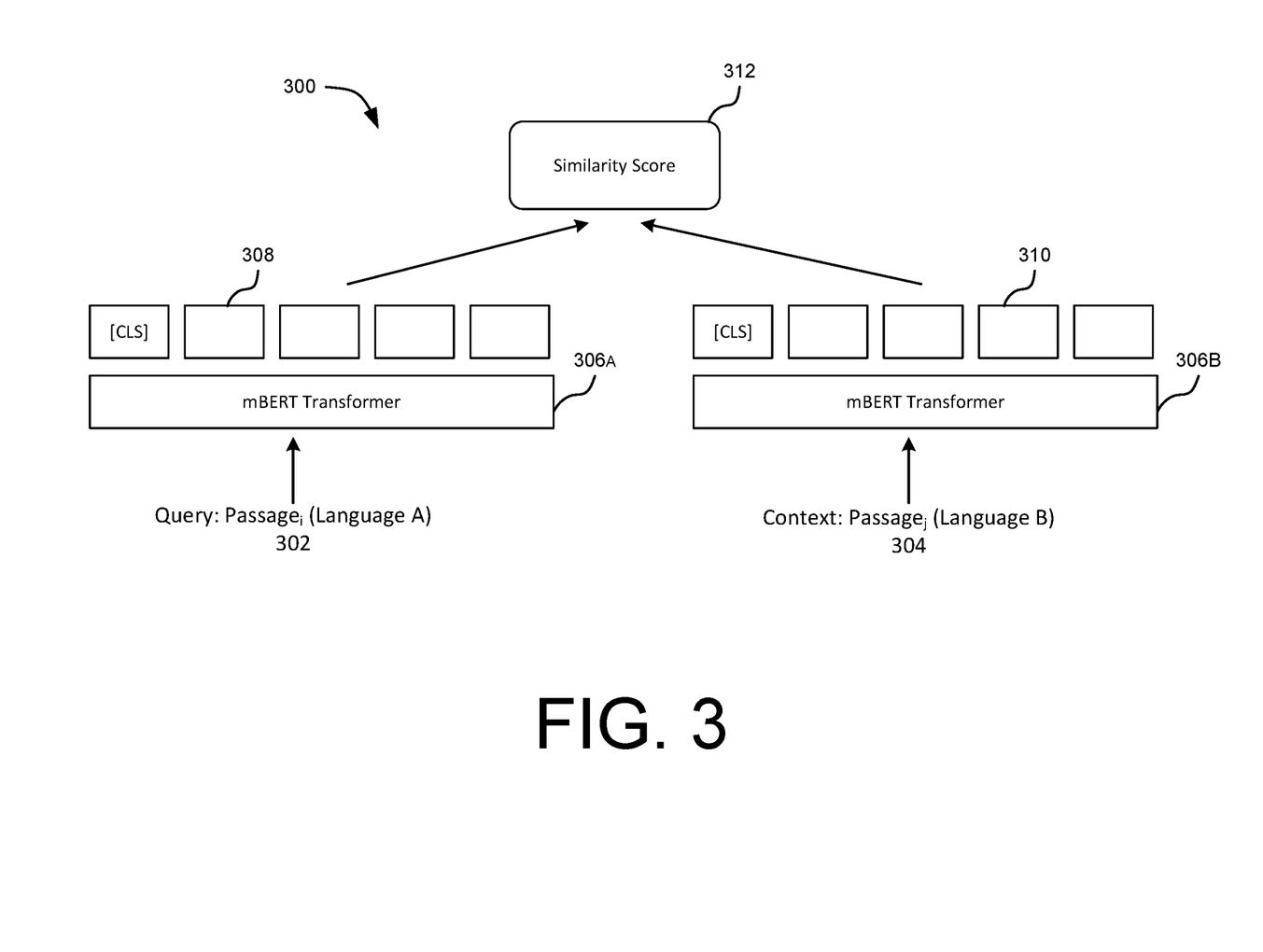
FIG. 3 illustrates a conceptual block diagram of a retriever for a multilingual keyword generation framework, according to at least some examples.

FIG. 3 illustrates a conceptual block diagram of a retriever 300 for a multilingual keyword generation framework, according to at least some examples. The retriever 300 may be an example of the retriever 206 of FIG. 2. Though the retriever 300 is shown having multiple components and a particular structure, the retriever may be arranged in any number of ways to accomplish the result of producing the similarity score that will be understood by those with skill in the art. The representation of the retriever 300 illustrates processes that may be performed as part of generating the similarity score.

The retriever 300 receives the query passage 302 and the context passage 304 into the mBERT transformer 306. In the block diagram, the query passage 302, in the low-resource language, is received at a first mBERT transformer 306A while the context passage, in the high-resource language, is received at a second mBERT transformer 306B. In some examples, the first mBERT transformer 306A and the second mBERT transformer 306B may be a shared mBERT transformer 306 that processes both the query passage 302 as well as the context passage 304. In this illustration, a single context passage 304 is discussed for processing, though multiple context passages 304 from the external knowledge 204 will be processed through the mBERT transformer 306. The output of the first mBERT transformer 306A is a d-dimensional vector 308 representative of the query passage 302 while the output of the second mBERT transformer 306B is a d-dimensional vector 310 representative of the context passage 304. For each context passage of the external knowledge 204, a separate d-dimensional vector is produced. The d-dimensional vectors are vector outputs having a set size or dimension, such that the mBERT transformer 306B processes each passage input to produce an identically sized vector. The d-dimensional vectors output by the mBERT may then be compared by performing a dot product, which requires vectors of the same size and dimensions. In some examples, the d-dimensional vectors may have a 768 dimensional size. In some examples, other sizes and dimensions of the vectors may be used, so long as the mBERT transformer 306B outputs the same size vector for every passage.

After generating the d-dimensional vectors 308 and 310, the retriever 300 determines a similarity score at 312. The similarity score may be produced based on a dot product similarity of the d-dimensional vectors 308 and 310. The similarity function may, for example describe a similarity between the query passage, $P_A$, and a context passage $P_B$ based on equation 1 below, where the query passage and the context passage are each passed through an encoder (such as the mBERT encoder) represented by $E_q$ and $E_p$.

$$sim(P_A, P_B) = E_q(P_A) \cdot E_p(P_B) \qquad \text{Equation 1}$$

The dot product of the d-dimensional vectors 308 and 310 produces a similarity score that may be used to identify a degree of similarity of the query passage 302 and the context passage 304. The similarity score may be presented in several ways and produced as a result of the dot product from equation 1 above. The similarity score is then used to identify the context passages that most similarly match the query passage 302 and thereby identify keywords associated with those similar passages for the generator 212 to receive as inputs for keyword generation.

Figure 4:
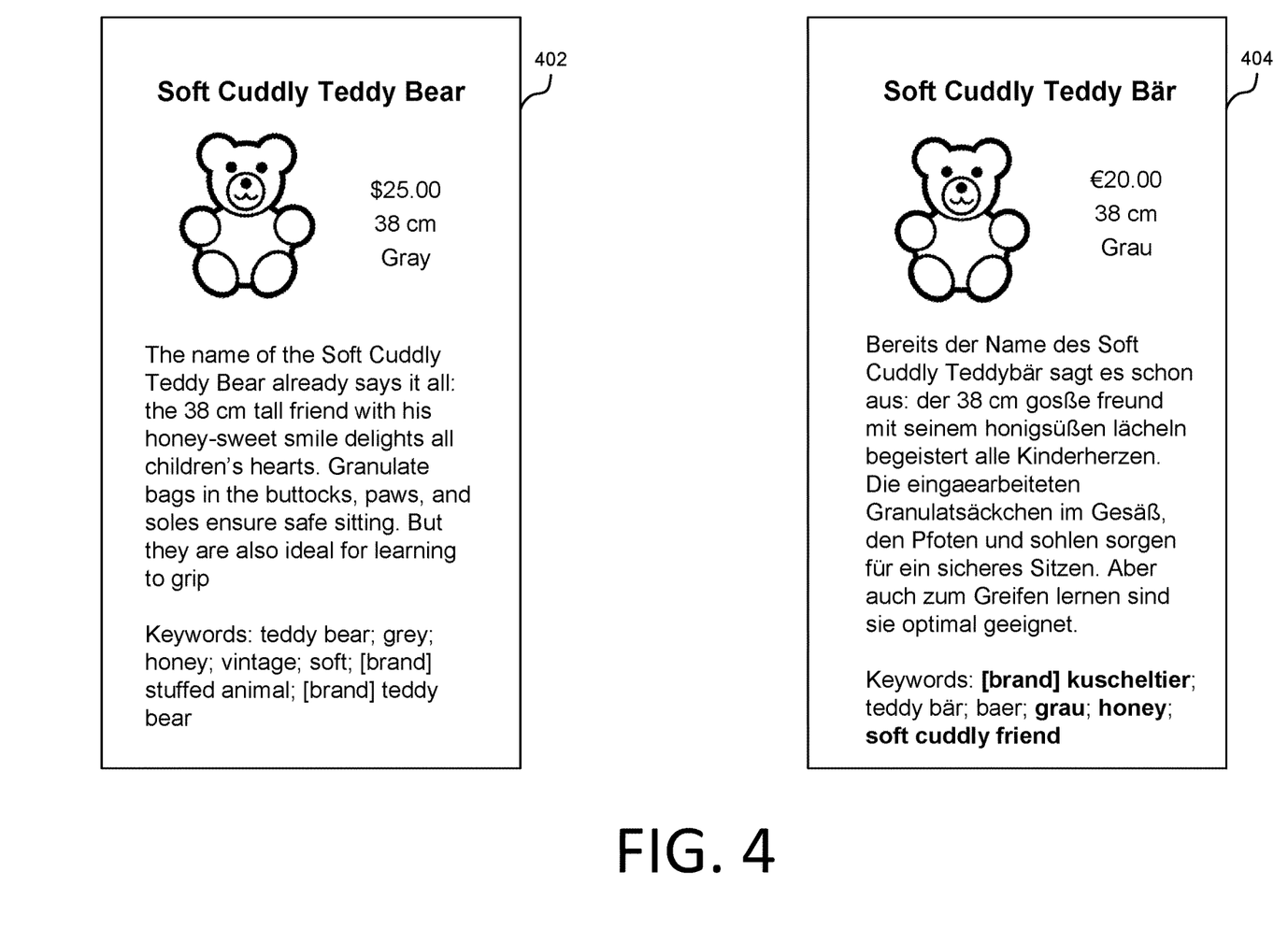
FIG. 4 illustrates an example set of items available from an electronic catalog with written descriptions in different languages illustrative of keyword generation results, according to at least some examples.

FIG. 4 illustrates an example set of items available from an electronic catalog with written descriptions in different languages illustrative of keyword generation results, according to at least some examples. The first example 402 is an item description for a teddy bear available from an online marketplace in a first language (e.g., English). The first language is a high-resource language. The first example 402 includes information about the item such as a title, price, size, color, description, and various assigned keywords. The assigned keywords may have been assigned by a manufacturer, service provider, extracted from the description, expert-defined, defined through the techniques described herein, or otherwise assigned to the item. In this example, the teddy bear is associated with a list of keywords including: "teddy bear; grey; honey; vintage; soft; [brand] stuffed animal; [brand] teddy bear." As shown in the example 402, the keywords include some words or phrases from the description, such as "teddy bear" and "honey" while other words are not included in the description but have been assigned to the item.

The second example 404 is for the teddy bear, this time available through an online marketplace in a second language, German. The second example 404 includes a German description, color, size, cost, and some keywords. In the second example 404, the keywords shown in non-bolded text are the keywords initially assigned to the item, including "teddy bär and "baer." The other keywords are generated through the techniques described herein. Initially, the second example 404 includes such limited keywords, and may not include any in some examples, that navigating the online marketplace to identify the teddy bear pictured may prove difficult or impossible due to the limited keywords available for classifying and identifying potential items from the catalog.

To generate the additional keywords, the retriever 206 receives, as inputs, the descriptions for items in the catalog, the descriptions may be for a subset of the items of the catalog, for example after applying an initial filter based on known keywords. In some examples, each of the descriptions may be processed to identify the similar passages. The first example 402 includes one such description that would be input to the retriever 206 as part of the external knowledge 204 while the description of the second example 404 is provided to the retriever 206 as the query passage. The description from each of the first example 402 and the second example 404 are processed by the mBERT transformer to produce the d-dimensional vector output for each description.

As depicted in FIG. 3, the d-dimensional vector outputs for the query passage and the context passage are then compared to generate a similarity score. In some examples, a machine learning model trained using multilingual description data performs the similarity analysis to output a similarity score. In some examples, the similarity score is based on the dot product of the two d-dimensional vectors, with a higher score indicative of a higher degree of similarity between the passages. After identifying the description from the first example 402 as having a similarity score exceeding a score threshold, the keywords associated with the first example 402 may be accessed from the external knowledge database. Additional keywords associated with other descriptions identified by the retriever 206 are similarly accessed and compiled together.

After compiling the keywords from the similar passages, such as the keywords of first example 402, the description of the second example 404 and the compiled keywords are input into the mBART generator to produce the final keywords for the second example 404. The bold terms of the second example 404 may be the newly generated keywords from the generator, including numerous terms not included in the description and thereby providing classification and search benefits for the catalog item.

Figure 5:
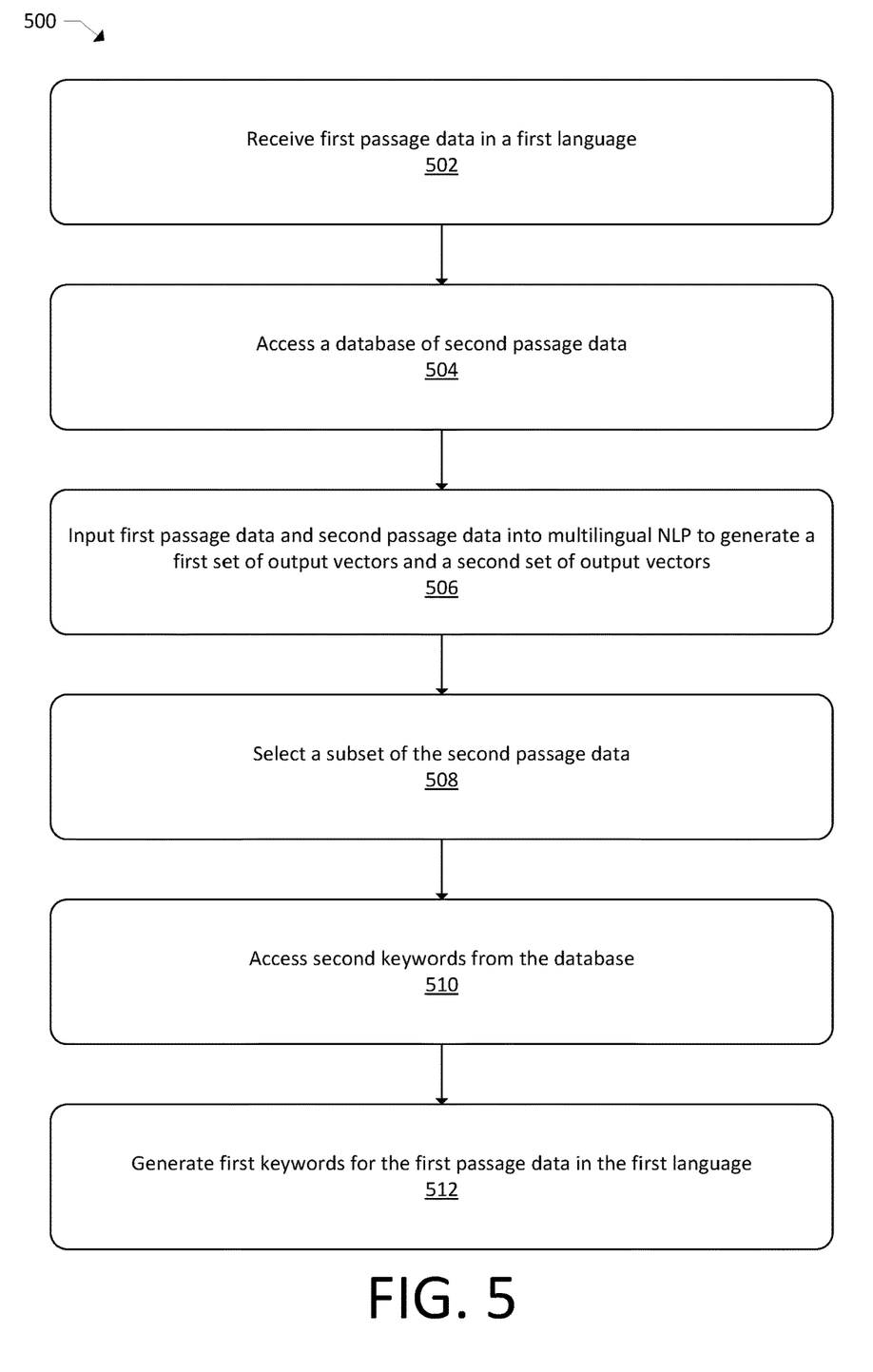
FIG. 5 illustrates a flow diagram of an example process for generating keywords from multilingual data for use in item categorization, according to at least some examples.

FIG. 5 illustrates a flow diagram of an example process 500 for generating keywords from multilingual data for use in item categorization, according to at least some examples. The processes described herein are illustrated as collections of blocks in logical flow diagrams, which represent a sequence of operations, some or all of which may be implemented in hardware, software or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform functions or implement data types. The order in which the blocks are described should not be construed as a limitation, unless specifically noted. Any number of the described blocks may be combined in any order and/or in parallel to implement the process, or alternative processes, and not all the blocks need be executed. For discussion purposes, the processes are described with reference to the environments, architectures and systems described in the examples herein, such as, for example those described with respect to FIGS. 1-3, although the processes may be implemented in a wide variety of other environments, architectures and systems. The order in which the operations or steps are described is not intended to be construed as a limitation, and any number of the described operations may be combined in any order and/or in parallel to implement process 500.

At 502, the process 500 includes receiving first passage data in a first language. The first passage data may include an item description in the first language, an article, a journal publication, abstract, or other string of text. The first language is a low-resource language such that keywords to summarize and/or classify the first passage data may not exist or may be difficult to produce in an automated manner. The first passage data may include the query passage described above.

At 504, the process 500 includes accessing a database of second passage data. In some examples, the second passage data includes multiple languages, while in some examples, the second passage data may be in a second language. The second passage data may include the external knowledge 204 and may include several different passages, each separate and distinct. The database, which may be the external knowledge 204, may also include keywords associated with each passage included with the second passage data.

At 506, the process 500 includes inputting the first passage data and the second passage data into a multilingual NLP algorithm to generate a first set of output vectors and a second set of output vectors. The multilingual NLP algorithm may be part of the retriever 206 of FIG. 2 and may be embodied on the keyword retrieval service computer(s) 112. The multilingual NLP algorithm may include one or more mBERT models that process the first passage data and the second passage data to produce d-dimensional vector outputs associated with each input into the algorithm as described with respect to FIG. 3 above. In some examples, the second passage data may include a subset of multilingual passage data. In an illustrative example, the second passage data may be selected or limited to passage data from within a category or classification shared by the object described by the first passage data. In the illustrative example, passage data describing a teddy bear may be compared against descriptions for items within a category for toys or stuffed animals rather than against descriptions of the entire catalog.

At 508, the process 500 includes selecting a subset of the second passage data. The subset of the second passage data may be identified by a machine learning model in some examples, The subset of the second passage data may be selected based on a similarity score between the passages of the second passage data and the first passage data. The similarity score may be determined as described above with respect to FIG. 3, based on a dot product of the d-dimensional vector outputs resulting from processing the first passage data and the vector outputs for each passage of the second passage data processed by the algorithm. The subset of the second passage data may include a predetermined number of passages, such as the top five or top ten most similar passages. In some examples, the subset may be selected based on the similarity score of the passages exceeding a predetermined threshold.

At 510, the process 500 includes accessing second keywords in the second language from the database. In some examples, the second language may include more than one language, for example including multiple different keywords of different languages. After identifying the subset of the second passage data, keywords associated with the subset of second passage data may be identified from the database and compiled together.

At 512, the process 500 includes generating first keywords for the first passage data in the first language. The generator 212 may generate the first keywords using the second keywords and the first passage data as inputs. In some examples, the generator 212 may include an mBART model, as described above. The first keywords are generated in the first language, thereby avoiding translation of the second keywords, which may introduce inadvertent errors or incorrect keywords.

While the foregoing is described with respect to the specific examples, it is to be understood that the scope of the description is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims.

What is claimed is:

1. A system comprising:
one or more processors; and
non-transitory computer-readable media storing computer-executable instructions that, when executed by the one or more processors, cause the one or more processors to perform operations comprising:
receiving a query passage of text describing an item available via an electronic marketplace, the query passage in a first language;
accessing a database having a plurality of reference passages in a second language describing a plurality of items available via the electronic marketplace, the plurality of items associated with a plurality of keywords used to identify the plurality of items in the second language within the electronic marketplace;
inputting the query passage in the first language into a multilingual natural language processing algorithm to produce a query vector output that embeds the query passage and has a first dimension;
inputting a subset of the plurality of reference passages in the second language into the multilingual natural language processing algorithm to produce a plurality of reference vector outputs, the plurality of reference vector outputs each having a second dimension identical to the first dimension;
identifying a reference passage from among the plurality of reference passages in the second language that is similar to the query passage in the first language in response to a dot product of the query vector output and a reference vector output of the plurality of reference vector outputs exceeding a predetermined threshold;
accessing, based on the subset of the plurality of reference passages, one or more keywords from among the plurality of keywords in the second language and associated with the subset of the plurality of reference passages;
providing, as inputs to a multilingual transformer, the query passage in the first language and the one or more keywords in the second language; and
generating, based on the inputs and using the multilingual transformer, one or more query keywords in the first language for the query passage.

2. The system of claim 1, wherein identifying the reference passage comprises:
performing the dot product of the query vector output and the reference vector output; and
dividing a result of the dot product by a magnitude of the query vector output multiplied by a magnitude of the reference vector output to produce a similarity score, the reference passage identified based on the similarity score.

3. The system of claim 1, wherein the multilingual natural language processing algorithm is iteratively self-trained by labelling the reference passage as a positive instance of the query passage in response to determining that the one or more keywords in the second language are used by the multilingual transformer to generate the one or more query keywords in the first language.

4. The system of claim 1, the generating the one or more query keywords further comprising:
concatenating the one or more keywords in the second language and the query passage in the first language into a sequence;
inputting the sequence into the multilingual transformer; and
generating the one or more query keywords in the first language using the multilingual transformer.

5. A method comprising:
receiving query passage data describing an item, in a first language, available via an electronic marketplace;
accessing a database having reference passage data describing a plurality of items in a second language, the plurality of items available via the electronic marketplace and associated with keywords used to identify the plurality of items in the second language within the electronic marketplace;
determining, using a multilingual natural language processing algorithm, a similarity score relating the reference passage data in the second language with the query passage data in the first language;
selecting, based at least in part on the similarity score, a subset of the reference passage data that is similar to the query passage data;
accessing, based at least in part on the subset of the reference passage data, one or more keywords from among the keywords in the second language and associated with the subset of the reference passage data;
providing, as inputs to a multilingual transformer, the query passage data in the first language and the one or more keywords in the second language; and
generating, using the multilingual transformer and based at least in part on the inputs, one or more query keywords in the first language for the query passage data.

6. The method of claim 5, wherein the similarity score is determined based at least in part on a dot product of a first output and a second output of the multilingual natural language processing algorithm, the first output corresponding to the query passage data and the second output corresponding to the reference passage data.

7. The method of claim 5, further comprising removing a subset of the one or more query keywords in response to the subset of the one or more query keywords including only numerical characters.

8. The method of claim 5, further comprising removing a subset of the one or more query keywords in response to determining that the subset of the one or more query keywords is duplicated among the one or more query keywords.

9. The method of claim 5, wherein generating the one or more query keywords comprises:
concatenating the one or more keywords and the query passage data into a sequence;
inputting the sequence into the multilingual transformer; and
generating the one or more query keywords using the multilingual transformer.

10. The method of claim 5, wherein the multilingual transformer comprises a bidirectional and auto-regressive transformer.

11. The method of claim 5, wherein the multilingual natural language processing algorithm is trained using training data comprising passage data and keyword data, the passage data and the keyword data identified from the subset of the reference passage data and the one or more query keywords, respectively, based at least on part on the similarity score.

12. The method of claim 5, wherein the multilingual natural language processing algorithm is iteratively self-trained by labelling the subset of the reference passage data as a positive instance of the query passage data in response to determining that inclusion of the subset of the reference passage data improves performance of generating the one or more query keywords.

13. A system comprising:
one or more processors; and
non-transitory computer-readable media storing computer-executable instructions that, when executed by the one or more processors, cause the one or more processors to perform operations comprising:
receiving query passage data describing an item, in a first language, available via an electronic marketplace;
accessing a database having reference passage data describing a plurality of items in a second language, the plurality of items available via the electronic marketplace and associated with keywords used to identify the plurality of items in the second language within the electronic marketplace;
determining, using a multilingual natural language processing algorithm, a similarity score relating the reference passage data in the second language with the query passage data in the first language;
selecting, based at least in part on the similarity score, a subset of the reference passage data that is similar to the query passage data;
accessing, based at least in part on the subset of the reference passage data, one or more keywords from among the keywords in the second language and associated with the subset of the reference passage data;
providing, as inputs to a multilingual transformer, the query passage data in the first language and the one or more keywords in the second language; and generating, using the multilingual transformer and based at least in part on the inputs, one or more query keywords in the first language for the query passage data.

14. The system of claim 13, the non-transitory computer-readable media storing additional computer-executable instructions that, when executed by the one or more processors, cause the one or more processors to perform additional operations comprising training the multilingual natural language processing algorithm by labelling the subset of the reference passage data as a positive instance of the query passage data in response to determining that the one or more keywords are used to improve performance of generating the one or more query keywords.

15. The system of claim 14, wherein determining that the one or more keywords are used in generating the one or more query keywords comprises comparing the one or more query keywords against one or more additional keywords generated without using the one or more keywords.

16. The system of claim 15, wherein training the multilingual natural language processing algorithm is iteratively repeated to self-train the multilingual natural language processing algorithm.

17. The system of claim 13, the non-transitory computer-readable media storing additional computer-executable instructions that, when executed by the one or more processors, cause the one or more processors to perform additional operations comprising training the multilingual natural language processing algorithm using training data comprising passage data and keyword data, the passage data and the keyword data identified from the subset of the reference passage data and the one or more query keywords, respectively, based at least on part on the similarity score.

18. The system of claim 13, wherein the multilingual transformer comprises a bidirectional and auto-regressive transformer.

19. The system of claim 13, the non-transitory computer-readable media storing additional computer-executable instructions that, when executed by the one or more processors, cause the one or more processors to perform additional operations comprising removing a subset of the one or more query keywords in response to determining that the subset of the one or more query keywords is duplicated among the one or more query keywords.

20. The system of claim 13, the non-transitory computer-readable media storing additional computer-executable instructions that, when executed by the one or more processors, cause the one or more processors to perform additional operations comprising removing a subset of the one or more query keywords in response to determining that the subset of the one or more query keywords includes only numerical characters.

* * * * *